United States Patent [19]

Brix

[11] Patent Number: 4,775,269
[45] Date of Patent: Oct. 4, 1988

[54] HAND HELD TOOL WITH REMOVABLE CHUCK

[75] Inventor: Peter Brix, Penzberg, Fed. Rep. of Germany

[73] Assignee: Hilti Aktiengesellschaft

[21] Appl. No.: 112,744

[22] Filed: Oct. 22, 1987

[30] Foreign Application Priority Data

Oct. 23, 1986 [DE] Fed. Rep. of Germany ....... 3636026

[51] Int. Cl.$^4$ .............................................. B23B 31/00
[52] U.S. Cl. ................................. 408/239 R; 279/78; 279/81; 403/322
[58] Field of Search ................ 279/1 A, 1 B, 1 T, 60, 279/61, 62, 77, 78, 81, 29, 30, 1 ME, 63, 64, 65; 403/322, 325, 377; 408/239 R

[56] References Cited

U.S. PATENT DOCUMENTS

| | | | |
|---|---|---|---|
| 1,341,934 | 6/1920 | Schoenborn | 279/81 |
| 2,543,290 | 2/1951 | Johansson | 279/78 |

FOREIGN PATENT DOCUMENTS 233355 9/1963 Austria ................... 279/62

Primary Examiner—Gil Weidenfeld
Assistant Examiner—Daniel W. Howell
Attorney, Agent, or Firm—Toren, McGeady & Associates

[57] ABSTRACT

In a hand-held tool, such as a power drill, a hammer drill, a powered screwdriver or the like, a chuck is secured on one end of an axially extending rotary spindle by ball-shaped locking members. The chuck has a driver socket which fits on one end of the rotary spindle. The locking members are located within openings in the driver socket and are displaced radially inwardly into recesses in the spindle by a support ring encircling the driver socket. Recesses in the spindle, in which the locking members are held, have a first surface extending transversely of the axial direction of the spindle with the first surface forming a pair of run-up ramp surfaces, each inclined to the axis of the spindle and relative to one another. Due to the rotation of the spindle, the locking members move along one of the run-up ramp surfaces within each recess and develop a force component in the axial direction of the spindle, pressing abutment surfaces of the spindle and the driver socket into contact with one another. If the direction of rotation is reversed, the ball members move from one run-up ramp surface to the other within the recess and maintain the contact of the abutment surfaces.

6 Claims, 1 Drawing Sheet

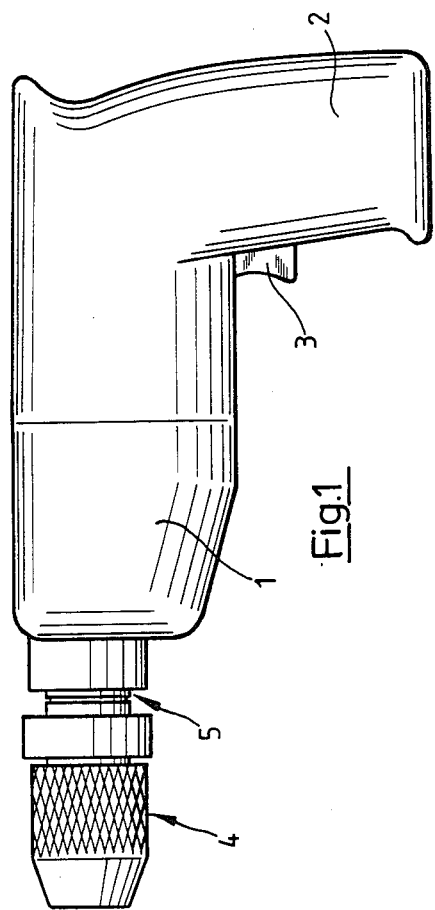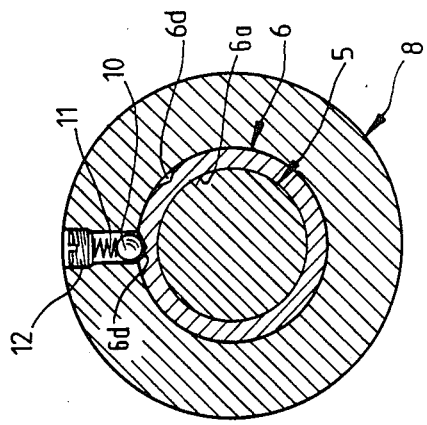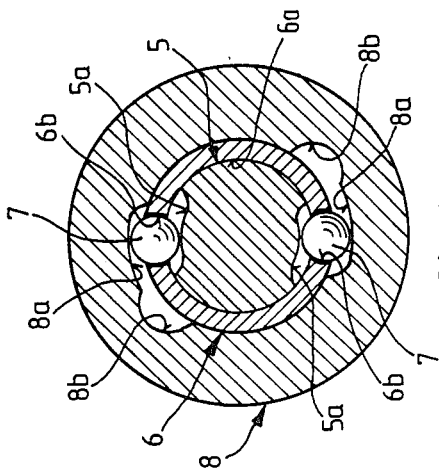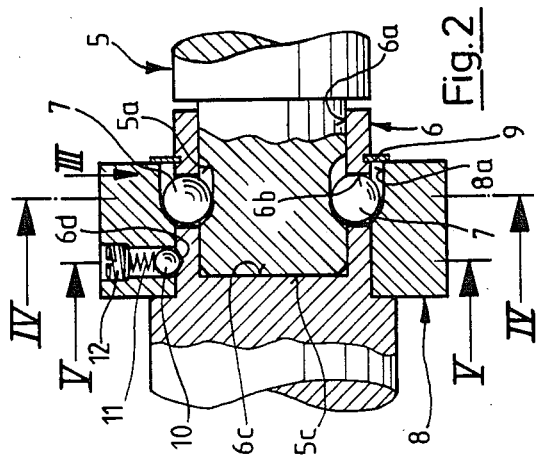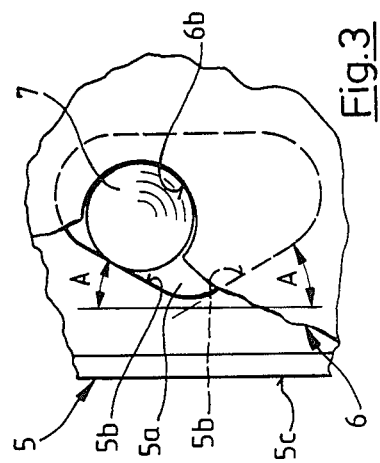

HAND HELD TOOL WITH REMOVABLE CHUCK

BACKGROUND OF THE INVENTION

The present invention is directed to a hand-held tool, such as a drilling tool, a powered screwdriver and the like, with a chuck for holding a tool bit removably secured on a rotating spindle. The chuck includes a driver socket at one end with openings for radially displaceable locking members. The driver socket is encircled by a rotatable support ring for retaining the locking members in recesses in the rotating spindle.

In hand-held tools, the chuck is subjected to high stresses and is usually detachably connected with the rotating spindle so that it can be easily replaced or repaired.

In the case of less complicated hand-held tools, the connection of the chuck is effected by screw threads. In actual operation, however, a screw thread can become tightened to such an extent that it cannot be loosened without the use of another tool. In hand-held tools, where the rotational direction can be reversed, such as in powered screwdrivers or the like, the screw thread can become loosened during operation. In other known hand-held tools, such as in DE OS No. 33 10 371, the chuck is secured on the rotating spindle by radially displaceable locking members. The locking members engage within recesses in the surface of the rotating spindle and are held against radial disengageeent by a support ring surrounding the driver socket. When the support ring is rotated for the removal of the chuck, the locking members shift into cutouts in the support ring. Such a connection type has the disadvantage that it is not free of play and the driver socket can move axially for a limited amount and rotate relative to the rotating spindle, unless additional securing means which involve an extra expenditure, such as special screws, are utilized.

SUMMARY OF THE INVENTION

Therefore, the primary object to the present invention is to provide for the connection of a tool bit chuck on a rotating spindle which is easily detachable and is also free of play.

In accordance with the present invention, recesses are provided in the axially extending surface of the rotating spindle with run-up ramp surfaces for the locking members and with cooperating stop surfaces on the rotating spindle and the driver socket for mutual axial abutment during operation of the hand-held tool.

The locking members located in the through openings of the driver socket contact, in the axial direction of the rotating spindle, one of the run-up ramp surfaces in each of the recesses of the rotating spindle. A force component acting in the axial direction is produced by the locking members acting on the run-up ramp surfaces, and the force component tends to displace axially the rotating spindle relative to the driver socket. Such relative axial displacement is possible, however, only until the stop or abutment surfaces on the rotating spindle and the driver socket contact one another. Accordingly, possible existing axial play between the driver socket and the rotating spindle is cancelled. As a result, the driver socket is clamped against the rotating spindle by the locking members.

It is advantageous in establishing the axial clamping for the run-up ramp surfaces to be inclined along a helical line about the axis of the spindle. Thus, the torque transmitted by the spindle presses the locking members against the run-up ramp surfaces. Due to the inclination of the ramp surfaces, a force component in the axial direction of the spindle is produced from the force acting in the circumferential direction and such force component is directly proportional to the torque being transmitted. If the torque increases, the abutment surfaces are pressed more tightly against one another. Accordingly, the torque transmitted through friction at the abutment surfaces, also increases. If the driver socket is rotated in the opposite direction, the clamping action is released.

For the use of such hand-held tools for the insertion and the removal of screws, at the present time many tools include a left-hand and right-hand switching circuit. To assure a secure connection of the chuck on the rotating spindle in such a device, the run-up ramp surfaces in the recesses extend from one another away from the end of the rotating spindle in contact with the chuck, so that two ramp surfaces are located in the recesses, each inclined to the axis of rotation. Accordingly, depending on the direction of rotation of the spindle, the locking members can run up against one or the other of the ramp surfaces. A certain rotational play can occur between the two opposite clamped positions. In actual operation, however, such play is automatically cancelled out with the reversal of the rotational direction.

Axial clamping is produced by the run-up of the locking element against the ramp surfaces in the recesses of the spindle so that the abutment surfaces on the driver socket and the rotating spindle are pressed against one another. In such an arrangement, a portion of the torque is transmitted at the abutment surfaces due to friction. The friction developed relieves the locking members of the proportional amount of the torque normally transmitted by the locking members. The axial clamping action is great if there is a small slope of the run-up ramp surfaces. If the slope increases, the clamping action drops off. Since the clamping action is readily released if the rotational direction is reversed, there are limits to the reduction of the slope downward because of self-locking. In view of the various requirements involved, the slope of the run-up ramp surface is preferably in the range of 15° to 45° and particularly about 30°. A slope in such a range is located with certainty outside the self-locking range.

Therefore, the clamping action can be relatively easily released without requiring any additional tool. The axial clamping is approximately as great as the force applied to the locking members in the circumferential direction.

The rotation of the spindle stresses the locking member in the circumferential, as well as axial direction. The force generated by such stresses extends obliquely to the axis of the chuck which is coaxial with the spindle. To avoid overstressing the locking members, they are preferably in the form of balls. Ball-shaped locking members can be fabricated in a relatively simple manner or can be purchased commercially if a standard dimension of the locking members is used. Since ball-shaped locking members do not have any preferred axis of rotation, they can adjust optimally between the through openings in the driver socket and the run-up ramp surfaces in the recesses of the rotating spindle.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawings:

FIG. 1 is an elevational view of a hand-held tool embodying the present invention;

FIG. 2 is a partial sectional view of the connection of a tool bit chuck on a rotating spindle of the hand-held tool shown in FIG. 1;

FIG. 3 is a side view, on an enlarged scale, of the connection between the chuck and the spindle viewed in the direction of the arrow III, in FIG. 2;

FIG. 4 is a cross-sectional view of the connection taken along the line IV—IV in FIG. 2; and FIG. 5 is a cross-sectional view of the connection taken along the line V—V in FIG. 2.

DETAILED DESCRIPTION OF THE INVENTION

In FIG. 1, a hand-held tool is illustrated and comprises a housing 1, with a handle 2 projecting downwardly from the housing. A trigger-like switch 3, is located in the handle 2, for operating the tool. As viewed in FIG. 1, the left-hand end of the housing 1 is its front end, and a chuck 4 for holding a tool bit is secured on a rotating spindle 5, located within the housing with its front end projecting outwardly from the front of the housing.

FIGS. 2 to 5, show the rotating spindle 5. Where it projects outwardly from the housing, the rotating spindle 5 has a reduced diameter axially extending section. The reduced diameter section has a pair of recesses 5a, diametrically opposite one another in the axially extending outside surface of the spindle. The chuck 4 has a driver socket 6 at its rear end which fits onto the reduced diameter front end of the rotating spindle 5. Driver socket 6 forms an axially extending blind bore 6a corresponding to the outside diameter of the reduced diameter section of the spindle in which the recesses 5a are formed.

Through openings 6b are formed diametrically opposite one another in the driver socket 6 and a ball-shaped locking member 7 is positioned within each of the openings. Locking members 7, note FIGS. 2 and 4, extend through the openings 6b, into the recesses 5a, in the front end of the spindle 5. Locking members 7 transmit torque from the spindle 5 to the chuck 4 and also afford axial clamping of the spindle 5 within the driver socket 6. As viewed in FIG. 3, the recesses 5a have two surfaces extending transversely of the axial direction of the spindle, one closer to the front end of the spindle and the other spaced further from it. The transversely extending surface of the recesses 5a, closer to the front end of the spindle, has a pair of run-up ramp surfaces 5b, each inclined at an angle to the perpendicular to the axis of the spindle. If the rotary spindle 5 is rotated relative to the driver socket 6, the locking members 7, move along one of the run-up ramp surfaces 5b within the recess 5a and press the front end of the spindle in the axial direction against the bottom of the driver socket 6. During the movement of the locking members 7, the transversely extending end surface 5c on the spindle and the corresponding transversely extending bottom surface 6c in the driver socket 6 pressed against one another. The surfaces 5c, 6c, form abutment surfaces. With the abutment surfaces 5c, 6c, pressed against one another static friction is developed so that a portion of the torque is transmitted through the abutment surfaces. A support ring 8 encircles the outer surface of the driver socket 6 and can be rotated relative to the socket. A snap ring 9 is secured in the radially outer surface of the driver socket 6 and secures the support ring 8 in position against an annular shoulder on the outside surface of the socket. In FIG. 4, it can be noted that the support ring 8 has two oppositely disposed pockets 8a recessed outwardly from its inside surface with the ball-shaped locking members 7 projecting outwardly through the driver socket 6 located within the pockets. The pockets 8a extend in circumferential direction with one end region of each socket having an increased depth recess 8b. As viewed in FIG. 4, if the support ring 8 is rotated in the clockwise relative to the rotating spindle 5 and the driver socket 6, the locking members 7 become aligned with the increased depth recesses 8b and can be displaced radially outwardly moving out of the recesses 5a in the outer surface of the roting spindle 5. Such relative rotational movement releases the connection between the rotary spindle 5 and the driver socket 6, so that the chuck 4 and its driver socket 6 can be removed from the front end of the rotary spindle 5. The two end positions of the support ring 8 in the circumferential direction are defined by a ball detent arrangement including a snap-in ball 10, a compression spring 11 and a threaded pin or set screw 12. When the support ring 8 reaches each of its opposite end positions, the snap-in ball 10 is biased into a detent opening 6d in the outside surface of the driver socket 6.

Due to the arrangement of the two run-up ramp surfaces 5b, in each of the forward transversely extending surfaces of the recesses 5a, with the ramps sloping from a common midpoint toward the opposite end of the spindle, the run-up ramps are sloped rearwardly in both rotational directions of the spindle. Accordingly, a bracing or clamping action is effected between the abutment surfaces 5c an 6c, in both rotational directions of the hand-held tool. If the direction of rotation is switched during operation, the locking member 7 moves from one run-up ramp surface 5b to the other. The axial play developed during the switching operation is immediately cancelled out. As can be seen in FIG. 3, the slope angle of the run-up ramp surfaces 5b is approximately 30°. The slope angle A of such magnitude affords a sufficiently great axial bracing of the abutment surfaces 5c, 6c, and a simple disengagement of the connection between the two parts when the rotational direction is reversed or for the removal of the chuck.

While specific embodiments of the invention have been shown and described in detail to illustrate the application of the inventive principles, it will be understood that the invention may be embodied otherwise without departing from such principles.

I claim:

1. Hand-held tool for use as a power drill, hammer drill, powered screwdriver and the like, comprising a housing having a front end and a rear end, an axially extending rotating spindle located in said housing and having a first end projecting from the front end of said housing, said rotating spindle having an axially extending outer surface extending from the first end thereof with recesses extending radially inwardly into said outer surface, an axially extending chuck in axial alignment with said spindle with said chuck having a first end and a second end spaced apart in the axial direction and including a driver socket at the second end for receiving a part of said spindle extending axially from the first end thereof, said driver socket having openings extending therethrough transversely of the axial direction, a locking member located in each of said openings, a locking ring encircling and in sliding contact with said driver socket in the region of said openings and being rotatable relative to said driver socket for retaining said locking members in said recesses in said spindle, wherein the improvement comprises that said recesses have a first surface and a second surface extending transversely of and spaced apart in the axial direction of said spindle with said first surface being located closer to the first end of said spindle, said first surface comprising run-up ramp surfaces for said locking members, said rotating spindle at the first end thereof and said driver socket each having an abutment surface extending transversely of the axial direction of said spindle and arranged to abut one another when said locking members are displaced along said run-up ramp surfaces.

2. Hand-held tool, as set forth in claim 1, wherein said run-up ramp surfaces are inclined along a helical line relative to the axis of the said spindle.

3. Hand-held tool, as set forth in claim 2, wherein two said run-up ramp surfaces are located within each of said recesses in a symetrical arrangement with each sloping from a common center point, away from the first end of said spindle.

4. Hand-held tool, as set forth in claim 2, wherein said run-up ramp surfaces are inclined at a slope angle in the range of 15° to 45° relative to a plane extending perpendicularly of the axis of said spindle.

5. Hand-held tool, as set forth in claim 4, wherein the slope angle is 30°.

6. Hand-held tool, as set forth in claim 1, wherein said locking members are ball-shaped.

* * * * *